(12) United States Patent
Nikain et al.

(10) Patent No.: US 11,184,226 B2
(45) Date of Patent: Nov. 23, 2021

(54) SYSTEMS AND METHODS FOR INTENT-BASED SELF CONFIGURATION OF VIRTUAL NETWORK FUNCTIONS

(71) Applicant: AT&T Intellectual Property I, L.P., Atlanta, GA (US)

(72) Inventors: Mohammad Nikain, Atlanta, GA (US); Daniel Connolly, Suwanee, GA (US); Vahid Tavassoli, Alpharetta, GA (US); Jiyuan Wang, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 16/298,380

(22) Filed: Mar. 11, 2019

(65) Prior Publication Data
US 2020/0295990 A1    Sep. 17, 2020

(51) Int. Cl.
H04L 12/24     (2006.01)
G06F 9/455     (2018.01)
H04L 29/06     (2006.01)

(52) U.S. Cl.
CPC ...... H04L 41/0813 (2013.01); G06F 9/45558 (2013.01); H04L 41/0896 (2013.01); H04L 69/04 (2013.01); G06F 2009/45595 (2013.01)

(58) Field of Classification Search
CPC . H04L 41/0813; H04L 41/0896; H04L 69/04; H04L 41/0893; H04L 67/12;
(Continued)

(56) References Cited

U.S. PATENT DOCUMENTS 9,436,443 B2    9/2016    Chiosi et al.
9,672,502 B2    6/2017    Chaudhary et al.
(Continued)

FOREIGN PATENT DOCUMENTS

WO    WO 2017/162531 A1    9/2017
WO    WO 2018/171587 A1    9/2018

OTHER PUBLICATIONS

Integrating VM Selection Criteria in Distributed Dynamic VM Consolidation Using Fuzzy Q-Learning; 2013 9th International Conference on Network and Service Management; Oct. 14-18, 2013.Masoumzadeh, Seyed Saeid et al. (Year: 2013).*

*Primary Examiner* — Tan Doan
(74) *Attorney, Agent, or Firm* — BakerHostetler (57) ABSTRACT

Methods, systems and computer readable media for self-configuration of virtual network functions based on user intent are provided. In a network, a destination with an initial offering having a set of initial offering attributes is provided. A first virtual network function is connected to the destination that is capable of advertising the initial offering. A source having a set of need attributes defined by a user is also provided. The initial offering is advertised, and the source is connected to the first virtual network function. A second virtual network function with an added value is added and a modified offering having a set of modified attributes based on the set of initial offering attributes and the added value is created. The initial offering and the modified offering is advertised to the source. The best offering from the initial offering and modified offering is selected based on the first set of need attributes, the first set of modified offering attributes and the set of initial offering attributes. The first source is then connected to the first best offering.

16 Claims, 6 Drawing Sheets

(58) Field of Classification Search
CPC ............. H04L 41/5096; G06F 9/45558; G06F 2009/45595; G06F 2009/4557; G06F 41/5096
USPC ........................................................ 709/220
See application file for complete search history.

(56) References Cited

U.S. PATENT DOCUMENTS

| | | | |
|---|---|---|---|
| 10,120,710 B2 | 11/2018 | Kosugi et al. | |
| 2016/0020962 A1 | 1/2016 | Carey et al. | |
| 2016/0234082 A1* | 8/2016 | Xia ..................... | H04L 41/5096 |
| 2016/0301579 A1* | 10/2016 | Djukic ................ | H04L 41/5009 |
| 2017/0111274 A1 | 4/2017 | Bays et al. | |
| 2017/0214737 A1 | 7/2017 | Agarwal et al. | |
| 2018/0034664 A1 | 2/2018 | Mulligan et al. | |
| 2018/0227244 A1* | 8/2018 | Zhang ................... | H04L 45/42 |
| 2018/0316559 A1 | 11/2018 | Thulasi et al. | |
| 2018/0316730 A1* | 11/2018 | Schaefer ............ | H04L 41/0803 |
| 2018/0331960 A1* | 11/2018 | Browne ............. | H04L 47/2441 |
| 2018/0375726 A1 | 12/2018 | Xia | |
| 2019/0044829 A1* | 2/2019 | Balzer ................... | G06N 20/00 |

\* cited by examiner

SYSTEMS AND METHODS FOR INTENT-BASED SELF CONFIGURATION OF VIRTUAL NETWORK FUNCTIONS

TECHNICAL FIELD

The present disclosure relates to the configuration of virtual network functions. More particularly, the disclosure relates to a method, system, and computer program for intent-based self configuration of virtual network functions.

BACKGROUND

With the advent of software defined networks (SDN) and network function virtualization (NFV), network services providers may replace dedicated appliances with software virtual network functions (VNFs) running on a single, universal platform. Typically, the platform is a commercial off-the-shelf server hosting a mix of open source and proprietary software from a variety of vendors. Multi-purpose network devices (aka white boxes, universal CPE, etc. referred to collectively as uCPE here) are generic boxes with a standard operating system (usually Linux based) which can then be "loaded" with virtual network functions (VNFs) which are basically VMs (virtual machines) from potentially different vendors and provide functions such as routing, firewall, wan acceleration, bonding, etc. These VNFs need to be interconnected and configured to provide the overall client needed features (within the uCPE). Due to the growing number of VNFs and the multi-vendor nature of these VNFs, configuring the uCPE is very complicated. Currently, these configurations are handled through a set of supported templates, each handling a fixed potential configuration. If a change is required, then either a transition plan between two specific templates must be available or the device has to be reset and loaded with a new template (potentially requiring service interruptions and additional reconfigurations). As the number of VNFs grow, the number of potential templates grows exponentially to support different ways the VNFs could be interconnected and also adds numerous transition plans among templates. The complexity of supporting such a large number of templates and transition plans is already nearing a breaking point and is sure to get worse with additional VNFs entering the market and more complex needs being required by the clients.

SUMMARY

One general aspect of the disclosure includes a method for intent-based configuration of virtual network functions that includes providing in a network a destination with an initial offering having a set of initial offering attributes; providing a first virtual network function connected to the destination capable of advertising the initial offering; and providing a first source having a first set of need attributes defined by a user. The initial offering is advertised, and the first source is connected to the first virtual network function. A second virtual network function with a first added offering value is added and a first modified offering is created. The first modified offering is provided with a set of modified offering attributes based on the set of initial offering attributes and the first added offering value. The initial offering and the first modified offering are advertised to the first source. The method then selects the best offering from the initial offering and modified offering based on the first set of need attributes, the first set modified offering attributes and the set of initial offering attributes. The method then connects the first source to the first best offering.

Implementations may include one or more of the following features. Adding a second source having a second set of need attributes and then making a choice, at the second source, of a second best offering from the initial offering, and the first modified offering. The choice of the second-best offering is made based on the first set of needs attributes, the set of initial offering attributes and the first set of modified offering attributes. Thereafter the second source is connected to the second-best offering. The method may also include adding a third virtual network function with a second added offering value. A second modified offering is created having a set of second modified offering attributes based on the set of initial offering attributes and the second added offering value. The method may also include advertising the initial offering, the first modified offering and the second modified offering to the first source.

One general aspect includes a system having a destination with an initial offering and a set of initial offering attributes associated with the initial offering. The system also includes a first virtual network function capable of advertising the initial offering and a first source having a first set of need attributes defined by a user. An advertising module associated with the first virtual network function that advertises the initial offering, a first analysis module in the first virtual network function determines if the first virtual network function can provide a first modified offering with a first added value.

One general aspect includes a non-transitory computer readable storage medium having computer-executable instructions that, when executed, cause a computer system to provide in a network a destination with an initial offering having a set of initial offering attributes. The computer executable instructions include instructions to provide a first virtual network function connected to the destination capable of advertising the initial offering. Further instructions to advertise the initial offering her provided. Instructions to provide a first source having a first set of need attributes defined by a user and connect, in a first connection, the first source to the first virtual network function are also included. Instructions also include instructions to add a second virtual network function with a first added offering value and to create a first modified offering having a set of first modified offering attributes based on the set of initial offering attributes and the first added offering value. Further the instructions cause a computer system to advertise the initial offering and the first modified offering to the first source an instruct the first source to make a choice of a first best offering from the initial offering and modified offering based on the first set of need attributes, the first modified offering attributes and the set of initial offering attributes. The computer system is then instructed to connect the first source to the first best offering.

DETAILED DESCRIPTION OF ILLUSTRATIVE EMBODIMENTS

Figure 1:
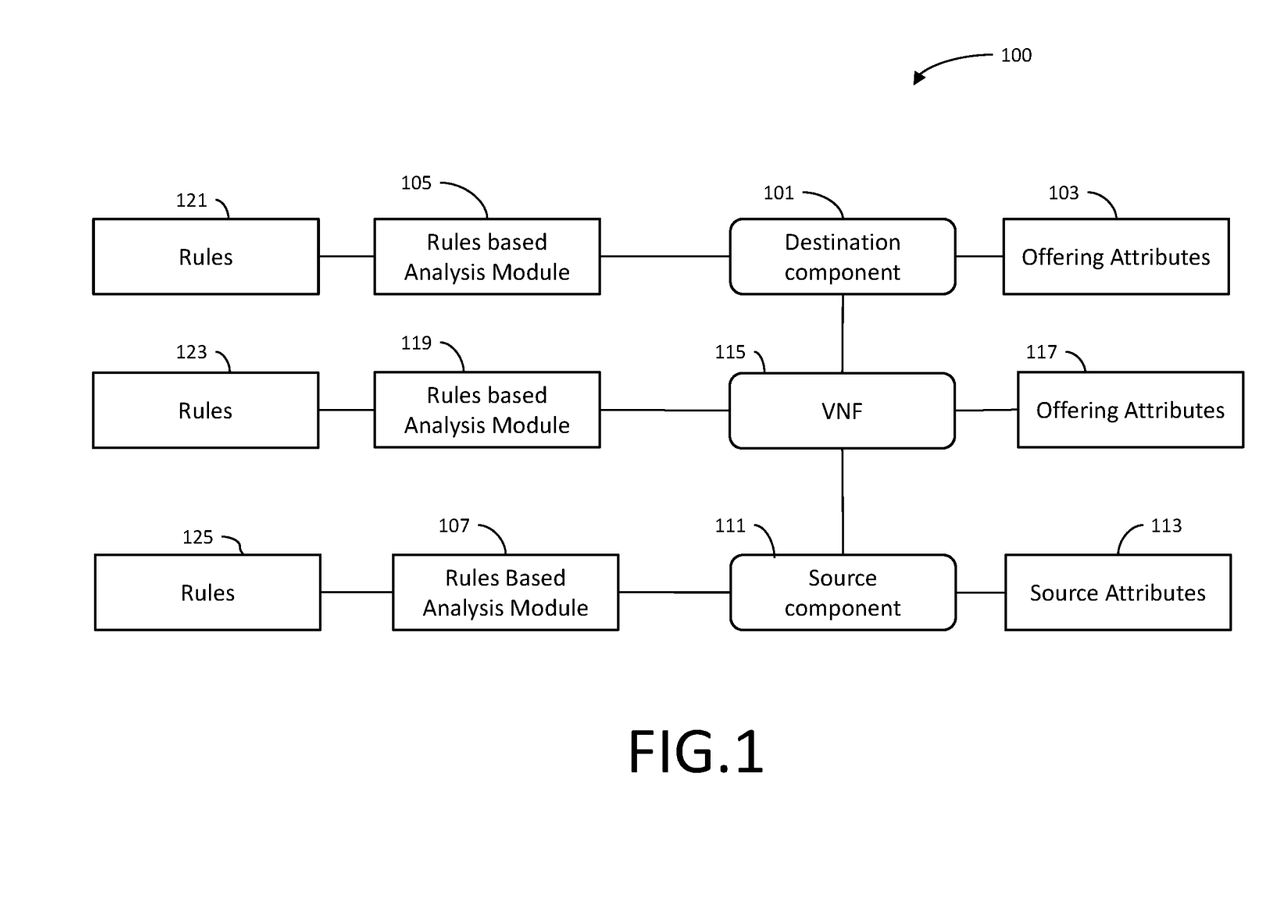
FIG. 1 is a block diagram for a system for intent-based self configuration of virtual network functions.

Illustrated in FIG. 1 is a system 100 for intent-based self configuration of virtual network functions. The system includes one or more destination components 101 (closely related to upstream/network ports e.g. a wide area network (WAN port). Associated with the destination components 101 is a set of offering attributes 103 and a rules—based analysis module 105. The offering attributes 103 identify the destination (e.g. Internet, enterprise network, etc.) or offerings. The system 100 also includes one or more source components 111 (closely related to downstream client-side ports e.g. local area networks (LANs) ports. Associated with the source component 111 are a set of source attributes 113 and a rules-based analysis module 107. The source attributes show the preferences for each destination and attribute of that destination (i.e. the customer intent, e.g. Internet plus protection) or needs. The attributes may include preferences for protection, costs, destination, speed, service, reliability etc. the attributes for both the offerings and needs are abstract in nature and can be defined uniquely for each installation and based on specific customer needs. Each of the source components 111 operates with an independent set of rules in the analysis module 107. The system 100 may include one or more virtual network functions (VNFs) 115 such as routers, firewalls, WAN accelerators and the like). A set of offering attributes 117 may be associated with VNFs 115. Additionally a rules based analysis module 119 may be associated with the VNFs 115. The system 100 may be defined within a universal customer premises equipment (uCPE (not shown) which comprises VNFs running on a standard operating system hosted on an open server. The rules-based analysis modules 123 provides each VNF with the intelligence to analyze customer needs and autonomously assemble with other VNFs to provide a working solution that best meets customer needs. The system 100 provides the functionality of self-assembly into a working configuration without a central orchestrator/coordinator. Additionally, each VNF operates with an independent set of rules (rules 121, 122 and 123) (not impacted by changes to other VNF's or introduction of new VNF's). Finally, the system 100 utilizes fuzzy logic to produce the best solution, even if the solution does not meet all of the needs of the client (it will get it as close as possible using the assets available in the uCPE).

Figure 2:
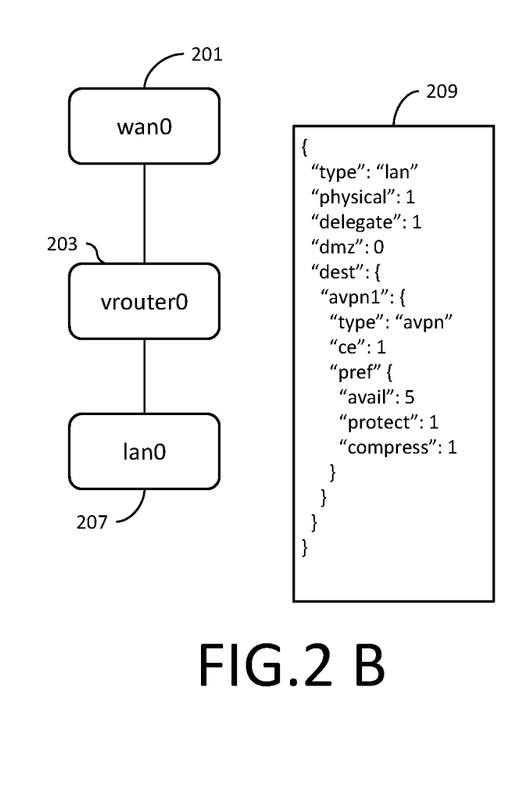
FIGS. 2A-2G are a set of block diagrams of an example of the operation of the system for intent-based self configuration of virtual network functions.

Illustrated in FIG. 2A-2G is an example of the operation of the system 100. In FIG. 2A a WAN and a virtual Router (labeled vRouter0 203) are defined in the system. The code for the display of the WAN0 201 and the vRouter0 203 is illustrated in box 205. FIG. 2B illustrates what happens when a lan0 207 is added to the system 100. Code for the display of the lan0 is illustrated in box 209. In that case vrouter0 advertises the availability of the port in vrouter0 and the attributes of that port, in this case no attributes are advertised, and lan0 attaches to best available offering which is a port of vrouter0 203. FIG. 2C illustrates what happens when a WAN accelerator vwanx0 211 is added to the system. In that case vrouter0 203 is advertising the availability of a port without specific attributes. Next, vwanx0 211 will attach to the best available offering to connect to which is the offering from vrouter0 203 and makes an offering indicating the availability of compression. Code for the display of the addition of one accelerator vwanx0 211 is illustrated in box 213. FIG. 2D illustrates the addition of a virtual firewall vfw0 215. In this example no needs are specified for vfw0 215 and so it may attach to vwanx0 211. FIG. 2E illustrates what happens when a lan1 219 having specific needs attributes is introduced into the system. Code for the display of the addition of lan1 219 is illustrated in box 221. In this case lan1 219 has specific needs attributes of availability (availability factor of 5), protection (protection factor of −2), and compression (compression factor of 1). Upon introduction into the system 100, lanl 219 looks at the existing offerings to determine where to connect. The existing offerings are the offering of vrouter0 203 which has no protection and no compression, the offering of vwanx0 211 which has the attribute of compression, and the offering of vfw0 215 which has the attribute of protection. In this case, lanl 219 looks at the available offerings and selects the offering from vwanx0 because it offers the desired compression and does not select the offering from vfw0 215 because the protection attribute for lanl 219 indicates that protection is not important. FIG. 2F illustrates what happens when a third LAN, lan2 223 is added to the system. Code for the display of the addition of lan2 223 is shown in box 225. In this case the attributes are availability=5, protection=1 and compression=−2. This example illustrates that protection is relatively more important than compression (shown with a value of −2). In this case, lan2 223 looks at the available offerings and selects the offering from vfw0 215 as the best offering because it offers protection through the firewall. FIG. 2G illustrates what happens in the system 100 when lan3 227 is added to the system. Code for the display of the addition of lan3 227 is shown in box 229. In this case the attributes are availability equal to 5, protection equal to 0 and compression equal to 0. Again, lan3 227 looks at all the available offerings and selects the offering from vrouter0 203 because it does not offer protection or compression.

The decisions at the source and destination are based on rules contained in the source and destination. For example, when a destination (e.g. a WAN) is provided, the rules may require that the destination be provided with a router. When a source (e.g. a LAN) is added the rules at the source may require that the system determine if there is a better fit for connection of the source. When a VNF (e.g. a WAN accelerator) is added the rules may determine if there is a better fit for the source based on the attributes of the source and the modified offering from the added VNF.

Figure 3:
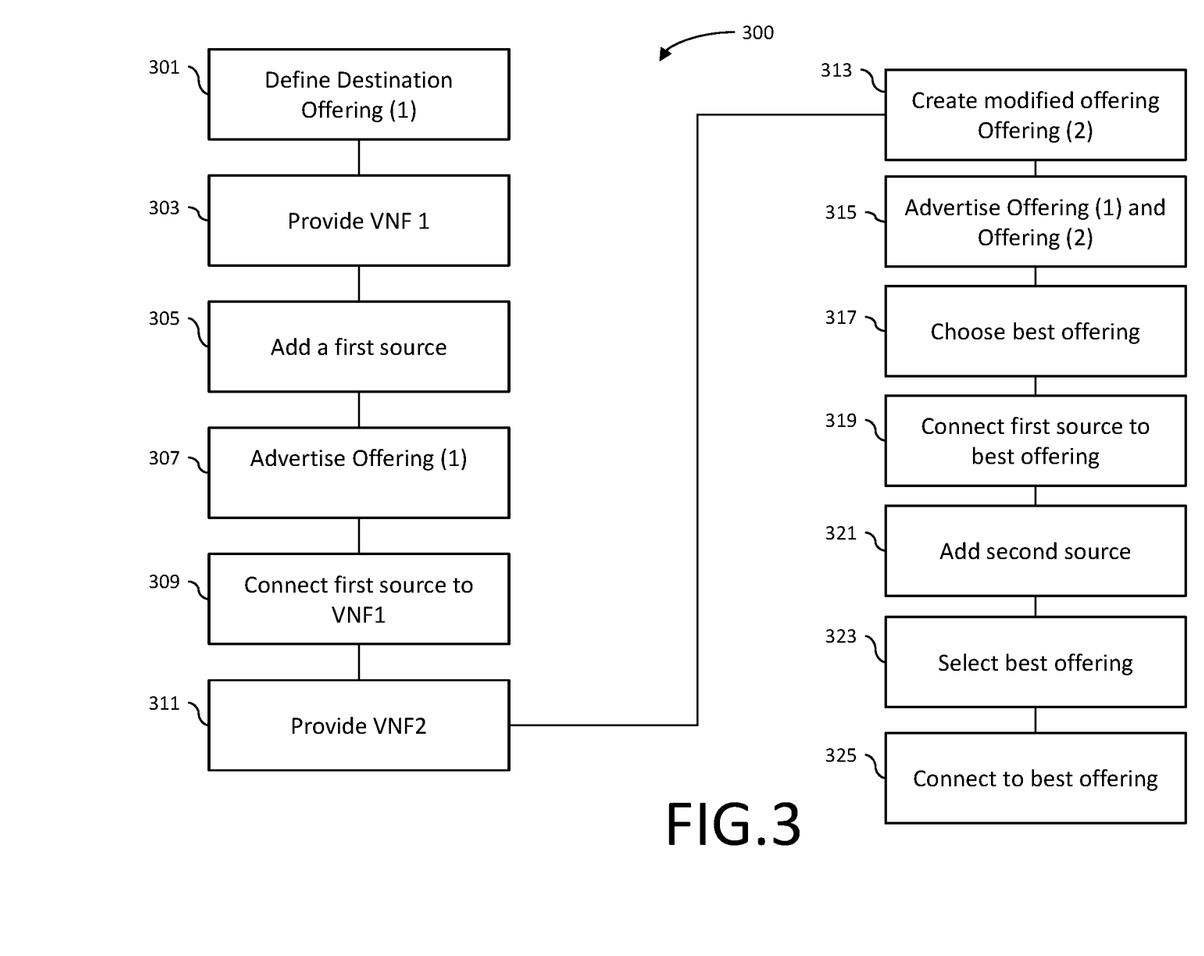
FIG. 3 is a flow chart of a method for intent-based self configuration of virtual network functions.

FIG. 3 is a flowchart of a method 300 for intent based self configuration of virtual network functions.

In step 301, the method 300 a destination with an initial offering (Offering (1)) is provided.

In step 303 a first VNF (VNF1) is provided capable of being connected to the destination.

In step 305, a first source (e.g. a LAN) is introduced into the system 100 and a first set of need attributed is defined by the user.

In step 307 VNF1 advertises the initial offering (Offering (1))

In step 309, the first source is connected to the destination.

In step 311 a second VNF (VNF 2) is provided. The second VNF may include a first added offering value (e.g. compression, protection, availability, cost, speed, service reliability, quality of service etc.).

In step 313 VNF2 may create a first modified offering with the first added offering value.

In step 315 VNF2 advertises the first modified offering with the first added offering value.

In step 317 first source will choose the best offering from the initial offering and the first modified offering. The choice will be based on the need attributes, and the offering attributes of the initial offering in the modified offering. For example, if the need attribute is protection, and VNF 2 is a firewall, and modified offering attribute would be protection, which would coincide with the need attribute of protection and VNF 2 would be selected as the best offering.

In step 319 the source would be connected to the VNF advertising the best offering.

In step 321, a second source may be added. The second source will have a set of second source attributes associated with the.

In step 323, the second source may select the best offering from among the initial offering in the first modified offering based on the offering attributes in the second source need attributes. For example, in the case where VNF 2 is a WAN accelerator, and the second source need attribute is compression, the best offering would be the offering from VNF 2 having the offering attribute of compression.

In step 325 the second source may connect to the best offering.

An aspect of the disclosure is implemented as a program product for use with a computer system. Program(s) of the program product defines functions of embodiments and can be contained on a variety of machine-readable media, which include, but are not limited to: (i) information permanently stored on computer readable devices including non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the disclosure, represent embodiments of the disclosure.

While the foregoing is directed to embodiments of the present disclosure, other and further embodiments of the disclosure may be devised without departing from the basic scope thereof, and the scope thereof is determined by the claims that follow.

What is claimed:

1. A method comprising:
   receiving a first set of need attributes for a first source, wherein the first set of need attributes comprises a first indication of compression for the first source;
   receiving a first advertisement, the first advertisement comprising an initial offering for a destination, wherein the destination is associated with a first virtual network function, wherein the initial offering comprises a set of initial offering attributes, wherein the set of initial offering attributes comprises a second indication of compression for the initial offering;
   connecting the first source to the first virtual network function based on the initial offering;
   receiving a second advertisement, the second advertisement comprising the initial offering and a modified offering from an added virtual network function, the modified offering comprising a set of modified offering attributes based on the set of initial offering attributes and an added offering value, wherein the modified offering attribute comprises a third indication of compression for the modified offering;
   determining, using fuzzy logic, a first best offering from the initial offering and the modified offering based on the first set of need attributes, the set of modified offering attributes, and the set of initial offering attributes;
   selecting the first best offering, wherein the first best offering comprises an offering from a virtual firewall that offers protection through the virtual firewall; and
   connecting the first source to the first best offering.

2. The method of claim 1, wherein the first best offering comprises a port of a virtual router.

3. The method of claim 1, further comprising determining the first best offering based further on a modified offering from an added virtual network function.

4. The method of claim 1 wherein the first set of need attributes comprises an indication of cost and speed.

5. The method of claim 1 wherein the first set of needs attributes comprise weighted values of a protection value.

6. A non-transitory computer readable storage medium having computer-executable instructions that, when executed, cause a computer system to:
   receiving a first set of need attributes for a first source, wherein the first set of need attributes comprises a first indication of compression for the first source;
   receiving a first advertisement, the first advertisement comprising an initial offering for a destination, wherein the destination is associated with a first virtual network function, wherein the initial offering comprises a set of initial offering attributes, wherein the set of initial offering attributes comprises a second indication of compression for the initial offering;
   connecting the first source to the first virtual network function based on the initial offering;
   receiving a second advertisement, the second advertisement comprising the initial offering and a modified offering from an added virtual network function, the modified offering comprising a set of modified offering attributes based on the set of initial offering attributes and an added offering value, wherein the modified offering attribute comprises a third indication of compression for the modified offering;
   determining, using fuzzy logic, a first best offering from the initial offering and the modified offering based on the first set of need attributes, the set of modified offering attributes, and the set of initial offering attributes;
   selecting the first best offering, wherein the first best offering comprises an offering from a virtual firewall that offers protection through the virtual firewall; and
   connecting the first source to the first best offering.

7. The non-transitory computer readable storage medium of claim 6 wherein the destination is a wide area network device.

8. The non-transitory computer readable storage medium of claim 6 wherein the first source is a local area network device.

9. The non-transitory computer readable storage medium of claim 6 wherein the first set of need attributes comprises cost, speed, and quality of service.

10. The non-transitory computer readable storage medium of claim 6 wherein the first set of needs attributes comprise weighted values for quality of service and speed.

11. A system comprising:
    one or more processors;
    memory connected with the one or more processors, the memory storing executable instructions that when executed by the one or more processors cause the one or more processors to effectuate operations comprising:
      receiving a first set of need attributes for a first source, wherein the first set of need attributes comprise a first indication of compression for the first source;
      receiving a first advertisement, the first advertisement comprising an initial offering for a destination, wherein the destination is associated with a first virtual network function, wherein the initial offering comprises a set of initial offering attributes, wherein the set of initial offering attributes comprises a second indication of compression for the initial offering;
connecting the first source to the first virtual network function based on the initial offering;
receiving a second advertisement, the second advertisement comprising the initial offering and a modified offering, the modified offering comprising a set of modified offering attributes based on the set of initial offering attributes and an added offering value, wherein the modified offering attribute comprises a third indication of compression for the modified offering;
determining, using fuzzy logic, a first best offering from the initial offering and the modified offering based on the first set of need attributes, the set of modified offering attributes, and the set of initial offering attributes;
selecting the first best offering, wherein the first best offering comprises an offering from a virtual firewall that offers protection through the virtual firewall; and
connecting the first source to the first best offering.

12. The system of claim 11, wherein the destination is a wide area network device.

13. The system of claim 11, wherein the first source is a local area network device.

14. The system of claim 11, wherein the first set of need attributes comprises protection.

15. The system of claim 11, wherein the first set of need attributes comprises availability and speed.

16. The system of claim 11, wherein the first set of need attributes comprises cost and speed.

* * * * *